Figure 1:
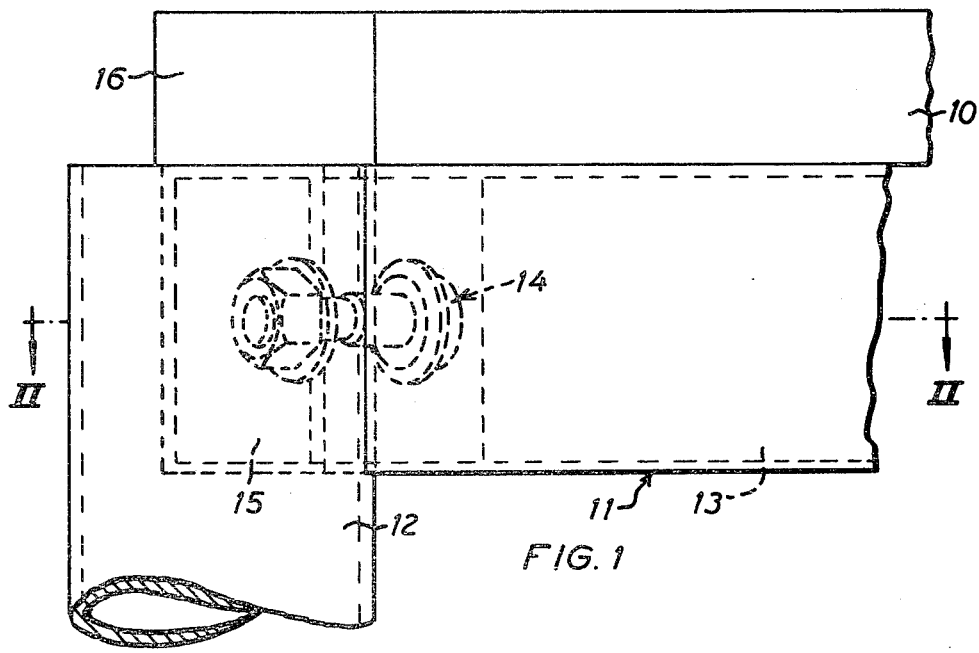

United States Patent [19]

Svensson

[11] 4,139,316

[45] Feb. 13, 1979

[54] DEVICE FOR CONNECTING TWO INCLINED TUBES TO A LEG OR OTHER TUBULAR PIECE

[75] Inventor: Algot I. Svensson, Mörarp, Sweden

[73] Assignee: Formfac International AB, Arlov, Sweden

[21] Appl. No.: 815,038

[22] Filed: Jul. 12, 1977

[51] Int. Cl.² .................................................. F16B 7/00
[52] U.S. Cl. .................................... 403/172; 108/111; 403/231; 403/295
[58] Field of Search .......................... 248/188, 188.1; 211/182; 108/111, 153; 403/171, 172, 176, 295, 297, 403, 231

[56] References Cited

U.S. PATENT DOCUMENTS

| 3,462,893 | 8/1969 | Kaiser | 403/297 X |
| 3,749,343 | 7/1973 | Marschak | 108/111 X |

FOREIGN PATENT DOCUMENTS

| 1189024 | 3/1959 | France | 403/171 |
| 593768 | 5/1959 | Italy | 108/111 |

| 175817 | 3/1922 | United Kingdom | 108/111 |

Primary Examiner—Price C. Faw, Jr.
Assistant Examiner—Conrad L. Berman
Attorney, Agent, or Firm—Ladas, Parry, Von Gehr et al.

[57] ABSTRACT

The disclosure relates in general to the connection art and in particular to the connection of two inclined tubes to a leg or other tubular piece in tables or similar articles. For improving the stability of such connections the ends of the two inclined square tubes extending above the prongs of the corner piece are obliquely cut such that their one side entirely conceals the corresponding side of the prongs and extends up to the seat and each forms an extension of the outer defining edges of the seat extending in the longitudinal direction of the leg or tubular piece in order, together therewith, to be held in abutment against the leg or tubular piece, the seat being designed to be urged laterally together with its extensions formed by the square tubes, against the leg or tubular piece substantially only along the defining edges and the extensions.

2 Claims, 2 Drawing Figures

DEVICE FOR CONNECTING TWO INCLINED TUBES TO A LEG OR OTHER TUBULAR PIECE

In the manufacture of, for example, tables, there is often a need for devices for connecting a frame formed of tubes to a leg or other tubular piece. In a prior art devices for this purpose, certain difficulties have been experienced in realizing satisfactory stability in the connection and satisfactory abutment between the two inclined tubes and the leg so that the frame is of a smart appearance. As a result, many prior art devices call for the placing of plastic pieces or other intermediate pieces consisting of relatively soft material between the leg and the ends of the two inclined tubes. Such intermediate pieces have, in this instance, not only entailed increased costs and greater difficulties but have also often had injurious effect upon the stability of the connection device.

A major aspect of the present invention is to obviate the disadvantages inherent in the prior art devices and thus realize a connection device which eliminates the need of intermediate pieces for realizing good connection between the inclined tubes and the leg or other tubular piece and which gives a high level of stability in the assembly.

Thus, the present invention relates to a device for connecting two inclined tubes to a leg or other tubular piece, the device having a corner piece with prongs projecting into the ends of the inclined tubes for anchoring the tubes to the corner piece and with a seat intended for the leg or other tubular piece, against which seat the leg or tubular piece is fixedly retained.

According to the invention, the seat is designed to be pressed against the leg or tubular piece substantially only along its outer defining edges extending in the longitudinal direction of the leg or tubular piece. This design will realize two narrow, substantially linear contact surfaces between the corner piece and the leg or tubular piece fixedly retained thereto, these two contact lines being located spaced from each other and, thus, together providing a great level of stability against inclination of the leg or tubular piece. Furthermore, very high abutment pressure at these contact lines will be obtained, since the leg or tubular piece is placed under tension in towards the seat and will thereby act as a taut spring.

A great advantage inherent in this device is that it is possible, if the inclined tubes are square tubes, to cut the ends of the square tubes obliquely in such a manner that one edge of each tube will be located at one of the above-mentioned defining edges of the seat and thus form an extension of the seat in order to be held, together with the seat, pressed against the leg or tubular piece. Thus, this design realizes a very good and tight joint between the two inclined tubes and the leg or tubular piece connected thereto.

When the leg or tubular piece which is to be connected to the two inclined tubes is of substantially circular cross-section, it is to be particularly preferred according to the present invention if the seat is concave with a shape corresponding to that of the leg or tubular piece but with a slightly smaller radius of curvature than the radius of the leg or tubular piece. The reason for this is that in this manner it is quite simple to achieve the above-disclosed narrow lines of contact between the seat and the leg or tubular piece.

The present invention and its aspects will be more readily understood from the following description of the accompanying drawing, and discussion relating thereto.

Figure 2:
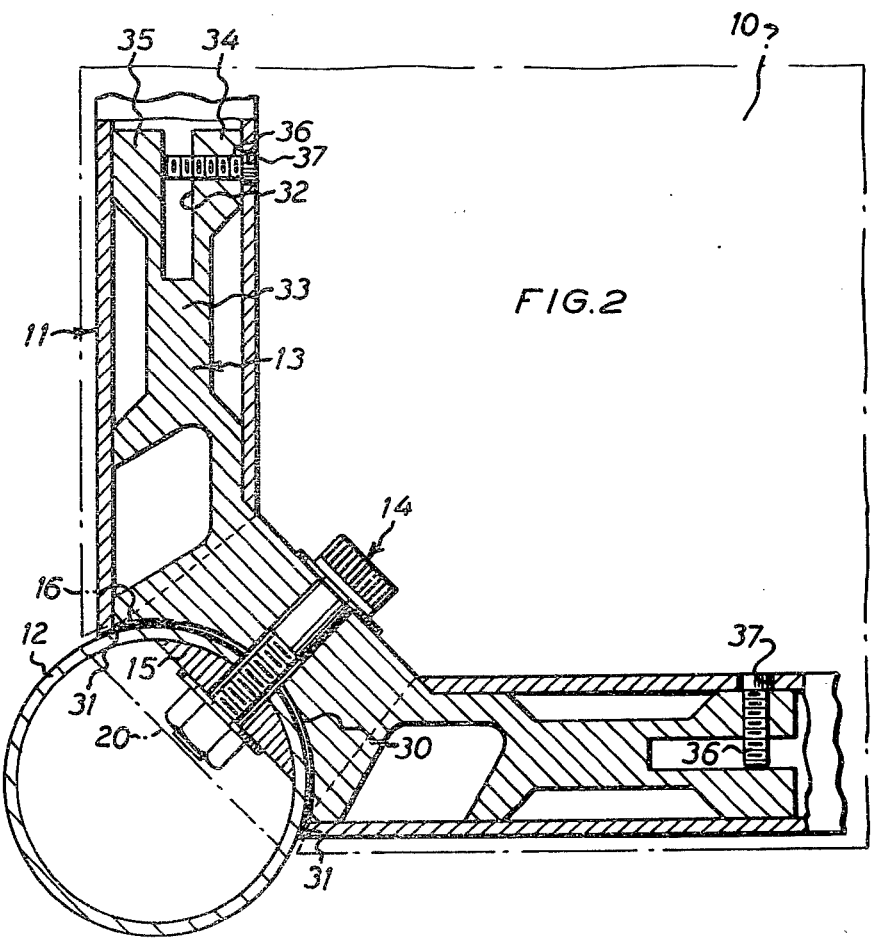

In the accompanying drawing:

FIG. 1 illustrates a portion of a leg, a frame and a table-top in a corner region; and FIG. 2 is a section taken along the line II—II in FIG. 1.

Thus, FIGS. 1 and 2 illustrate a table-top 10, a frame 11 and a leg 12. The leg 12 and the frame 11 are locked together by means of a corner fitting or corner piece 13 which is angular in shape and projected into the ends of the square tubes which form the sides of the frame 11. These angular corner pieces 13 have, in their corner, through-holes, which are located in register with corresponding holes in the leg 12 so that a clamp bolt 14 may extend into the interior of the leg 12 and, by means of a nut, press an abutment piece 15 against the inner side of the tubular leg 12. This abutment piece 15 may possibly act itself as a nut. As is apparent from FIGS. 1 and 2, the table-top 10 has a recess 16 in the region of the leg 12, and this recess is of a form which substantially corresponds to the cross-section of the leg, as is particularly apparent from FIG. 2, in which the table-top 10 has been drawn with dash-dot lines. It is possible to insert into the upper end of the tubular leg 12 a plug (not shown) with a guide pin which has a recess (marked with the dash-dot line 20 in FIG. 2) which ensures that the guide pin does not come into contact with the clamp bolt 14 projecting into the leg 12 and the abutment piece 15.

As is apparent from FIG. 2, the corner piece 13 is provided with a seat 30 which terminates at outer defining edges 31. In the illustrated embodiment, this seat is designed as a portion of a cylindrical casing surface and is of slightly smaller radius of curvature than the radius of the leg 12. If the leg is of a radius of 25 mm, the radius of curvature of the seat surface 30 should suitably be from 0.5 to 1 mm less. As a result, the leg will be pressed against the seat substantially along two rather narrow linear contact surfaces adjacent the outer defining edges 31 so that the abutment pressure between the leg and the corner piece will be very great. At the same time, the portion of the leg 12 held under tension between the defining edges 31 will act as a taut spring which provides very high stability to the assembly. Because the contact surfaces between the leg 12 and the corner piece 13 are substantially linear, effective control against inclination of the leg relative to the angular piece 13 will be obtained.

As is also apparent from FIG. 2, the two tubes 11 forming the frame have been cut obliquely at their outer ends so that one side of the tubes will form an extension of the seat 30 outside the defining edges 31 of the seat. In this manner, the frame tubes 11 will also be pressed hard against the leg 11 so that the joint between the leg and the tubes is very tight.

As is further apparent from FIG. 2, the free prongs of the corner piece 13 have been provided with recesses and projections for forming abutment surfaces between the corner piece and the frame tubes 11. As a result, effective guidance of the corner piece in the tubes will be obtained. Moreover, the prongs of the corner piece have, at their free outer ends, a recess 32 which extends into a narrower portion 33 of the prongs. Thus, this recess 32 divides the free ends of the prongs into two portions 34, 35 which can be forced apart by means of a locking screw 36 for retaining the corner piece in the frame tubes 11 by expansion effect. The locking screw 36 is accessible from the inside of the frame through a hole 37 in the frame tubes 11.

What I claim and desire to secure by Letters Patent is:

1. Means for connecting an elongated piece and two square tubes making an angle to each other and to said elongated piece, comprising a corner piece; prongs on said corner piece projecting into the ends of said square tubes and detachably anchored thereto, an open seat formed in said corner piece for laterally receiving said elongated piece; the opening in said seat being slightly smaller than the cross-section of the elongated member so that contact between said seat and the elongated member is established along narrow linear contact surfaces, clamping means for holding said elongated piece against said linear contact surfaces, obliquely cut ends on said square tubes extending over the prongs of the corner piece so as to entirely conceal the sides of said prongs and extend up to the seat formed in the corner piece, and press the square tubes against the elongated piece.

2. Means for connecting an elongated piece of substantially circular cross-section and two square tubes making an angle to each other and to said elongated piece, comprising a corner piece; prongs on said corner piece projecting into the ends of said square tubes and detachably anchored thereto by means of an expander device, an open concave seat formed in said corner piece for laterally receiving said elongated piece; the radius of curvature of the seat being slightly smaller than that of the elongated piece so as to establish line contact between the seat and the elongated piece, clamping means for holding said elongated piece against said seat; and obliquely cut ends on said square tubes extending over the prongs of the corner piece so as to entirely conceal the sides of said prongs and extend up to the concave seat, and press the elongated piece against the corner piece.

* * * * *